United States Patent
Madan et al.

(10) Patent No.: US 12,356,252 B2
(45) Date of Patent: Jul. 8, 2025

(54) METHOD AND SYSTEM FOR AUTO-COMMISSIONING VIRTUALIZED RADIO ACCESS NETWORKS

(71) Applicant: RAKUTEN MOBILE, INC., Tokyo (JP)

(72) Inventors: Ashish Madan, Singapore (SG); Manish Kumar, Tokyo (JP); Shubham Rathore, Indore (IN); Apoorva Soni, Indore (IN); Alok Singh Pawar, Indore (IN); Rahul Atri, Singapore (SG); Amber Jain, Indore (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/924,954

(22) PCT Filed: Sep. 13, 2022

(86) PCT No.: PCT/US2022/043268
§ 371 (c)(1),
(2) Date: Nov. 11, 2022

(87) PCT Pub. No.: WO2023/244257
PCT Pub. Date: Dec. 21, 2023

(65) Prior Publication Data
US 2024/0224122 A1    Jul. 4, 2024

(30) Foreign Application Priority Data
Jun. 14, 2022    (IN) .............................. 202241034050

(51) Int. Cl.
*H04L 41/08* (2022.01)
*H04L 41/0806* (2022.01)
(Continued)

(52) U.S. Cl.
CPC ......... *H04W 28/16* (2013.01); *H04L 41/0806* (2013.01); *H04L 61/5007* (2022.05); *H04W 4/50* (2018.02); *H04W 8/26* (2013.01)

(58) Field of Classification Search
CPC ......... H04W 28/16; H04W 4/50; H04W 8/26; H04W 24/02; H04W 16/02;
(Continued)

(56) References Cited

U.S. PATENT DOCUMENTS

2020/0162348 A1* 5/2020 Suthar .................... H04W 24/02
2021/0320844 A1* 10/2021 Kumar ................ H04L 41/0895

OTHER PUBLICATIONS

International Search Report issued Jan. 31, 2023 in Application No. PCT/US22/43268.
(Continued)

*Primary Examiner* — Joseph E Dean, Jr.
(74) *Attorney, Agent, or Firm* — Sughrue Mion, PLLC

(57) ABSTRACT

An auto-commissioning server may be used in the auto-commissioning of virtualized Radio Access Networks (vRANs) by receiving a plurality of parameters from a site controller of a cell site, an inventory, and a plurality of network entities; automatically generating a day zero configuration based on the received plurality of parameters; deploying the network function(s) of the vRANs into a cloud server based on the automatically generated day zero configuration; receiving a power-on notification message from a RU of the cell site, wherein the power-on notification message may indicate the RU of the cell site is ready for radio signal transmission; and activating the deployed network function(s) of the vRANs before transmitting a radio signal from the RU of the cell site.

17 Claims, 7 Drawing Sheets

(51) Int. Cl.
*H04L 61/3015* (2022.01)
*H04L 61/5007* (2022.01)
*H04W 4/50* (2018.01)
*H04W 8/26* (2009.01)
*H04W 28/16* (2009.01)

(58) Field of Classification Search
CPC ............. H04L 41/0806; H04L 61/5007; H04L 41/0886; H04L 61/3025; H04L 41/0895; H04L 41/0853; H04L 41/0876
See application file for complete search history.

(56) References Cited

OTHER PUBLICATIONS

Written Opinion issued Jan. 31, 2023 in Application No. PCT/US22/43268.

* cited by examiner

METHOD AND SYSTEM FOR AUTO-COMMISSIONING VIRTUALIZED RADIO ACCESS NETWORKS

CROSS-REFERENCE TO RELATED APPLICATIONS

This application is a National Stage of International Application No. PCT/US2022/043268 filed on Sep. 13, 2022, claiming priority to Indian Patent Application number 202241034050, filed on Jun. 14, 2022, the disclosure of which is incorporated herein by reference in its entirety.

1. FIELD

The present disclosure relates to wireless communication, and more specifically the present disclosure relates to a method and system for auto-commissioning of virtualized Radio Access Networks (vRANs).

2. DESCRIPTION OF RELATED ART

In general, mobile operators continue to experience an enormous demand for various functionality (e.g., high-speed communication) from a user of an electronic device (e.g., smartphone), which is being driven by multimedia applications and an ever-increasing number of electronic devices connected to a network (e.g., fifth generation mobile network). To remain resilient in a market, the mobile operators must deploy cell sites fast and efficiently. A cell site deployment process, on the other hand, is complicated and requires several parties such as tower builders and radio manufacturers.

Furthermore, the cell site deployment process involves different phases to deploy cell sites. One example is an installing phase, where a cell site infrastructure is installed with various network hardware elements along with required facilities, such as electricity, cabling, and antenna mounts. Another example is a cell site integration and commissioning phase. The integration and commissioning phase is when a network hardware element (e.g., Radio Unit (RU)) is added to the network. During a time of the integration and commissioning phase, the cell site testing is done to ensure that all hardware elements are functioning as recommended by administrators or mobile operators. One primary test, among others, is communication and call testing. A quality evaluation is then conducted and presented for approval to hardware vendors and the administrators.

Traditionally, the cell site commissioning has been a time-consuming, costly, labor-intensive, and largely inefficient manual operation. Consider the following scenario: A network has several cell sites, and the mobile operators wish to deploy cell sites quickly and efficiently. However, due to the manual process, a vendor or a cell site engineer may need to physically visit each cell site. Each cell site visit may require a significant amount of time (e.g., three to four hours, a few days, or more) for the commissioning. Further, if datacenters are also not ready, it may take even longer (e.g., days to weeks, or more) for the commissioning. On the other hand, even if the vendors may remotely perform the commissioning process, the vendors still need to manually perform said commissioning process. As such, in the conventional methods, the mobile operators must use a significant amount of human labor and/or financing to complete the commissioning on time. Furthermore, there is a possibility of human error when commissioning the cell site by the manual process.

Thus, it is desired to address the above-mentioned disadvantages or other shortcomings or at least provide a useful alternative for cell site commissioning.

SUMMARY

Accordingly, a method and system for auto-commissioning virtualized Radio Access Networks (vRANs) is provided. In one embodiment, a method may include receiving, by an auto-commissioning server, a plurality of parameters from a site controller of a cell site, a database, and a plurality of network entities. The method may further include automatically generating, by the auto-commissioning server, a day zero configuration based on the received plurality of parameters. Further still, the method may also include deploying, by the auto-commissioning server, network function(s) of vRANs into a cloud server based on the automatically generated day zero configuration. The network function(s) of vRANs may be at least one of cloud native, virtual, or containerized. Additionally, the method may include receiving, by the auto-commissioning server, a power-on notification message from a Radio Unit (RU) of the cell site, and the power-on notification message may indicate that the RU of the cell site is ready for radio signal transmission. Also, the method may include activating, by the auto-commissioning server, the deployed network function(s) of vRANs before transmitting a radio signal from the RU of the cell site.

In one embodiment, receiving, by the auto-commissioning server, the plurality of parameters from the site controller may include receiving, by the auto-commissioning server, a first set of parameters of the plurality of parameters from the site controller. The first set of parameters may include connectivity information associated with the cell site and the datacenter, and the first set of parameters may be stored in a database.

In another embodiment, receiving, by the auto-commissioning server, the plurality of parameters from the database may include receiving, by the auto-commissioning server, a second set of parameters of the plurality of parameters from the database. The second set of parameters may include cell site information and datacenter information. The cell site information and the datacenter information may include a logical identifier associated with each network entity of the cell site and/or the datacenter, and physical information associated with each network entity of the cell site and/or the datacenter, and the second set of parameters is stored in the database.

In an embodiment, receiving, by the auto-commissioning server, the plurality of parameters from the plurality of network entities may include receiving, by the auto-commissioning server, a third set of parameters of the plurality of parameters from the plurality of network entities. The plurality of network entities may include a Radio Access Network (RAN) planning tool, an Internet Protocol (IP) address controller, a naming controller, and a security engine.

In an embodiment, receiving, by the auto-commissioning server, the third set of parameters of the plurality of parameters from the plurality of network entities may include receiving, by the auto-commissioning server, a Radio Access Network (RAN) planning data and a Radio Unit (RU) mapping information with the network function(s) from the RAN planning tool. The network function includes a Centralized Unit Control plane (CUCP), Centralized Unit User Plane (CUUP), and virtual Distributed Unit (vDU) and the auto-commissioning server may identify the cloud server where the network function is to be instantiated. The RF planning data may include at least one of a Physical Cell Identifier (PCI) or a Root Sequence Index (RSI). Further, the method may include receiving, by the auto-commissioning server, a plurality of IP addresses for the network function(s) and the RU of the cell site from the IP address controller. The plurality of IP addresses may be generated based on a selected cloud server for the deployment of the network function(s). Additionally, the method may include receiving, by the auto-commissioning server, a unique hostname for the network function(s). The unique hostname may be generated based on at least one of a type of network function or location information associated with the cloud server. Also, the method may include receiving, by the auto-commissioning server, a unique Transport Layer Security (TLS) username and password from a security engine to enroll a certificate from a Certificate Authority server. The certificate may be automatically installed for the network function(s).

In one embodiment, deploying, by the auto-commissioning server, the network function(s) in the cloud server of the plurality of network entities based on the automatically generated day zero configuration may include sending, by the auto-commissioning server, a request to the cloud server to deploy the network function(s); deploying, by the auto-commissioning server, the network function(s) in the cloud server; and receiving, by the auto-commissioning server, a status message from the cloud server. The status message may include an indication of at least one of a successful deployment of the network function(s) or a deployment failure of the network function(s).

In another embodiment, the method may include automatically registering, by the auto-commissioning server, the plurality of generated IP addresses of the network function(s) and associated Fully Qualified Domain Name (FQDN) in a Domain Name System (DNS) server. Further, the method may include sending, by the auto-commissioning server, updated information to the database to store the updated information. The updated information may include the status message along with a logical identifier related to the network function(s).

In yet another embodiment, activating, by the auto-commissioning server, the deployed network function(s) of vRANs before transmitting a radio signal from the RU of the cell site may include sending, by the auto-commissioning server, a request to a configuration management device to generate a day-one configuration of the network function(s) based on receiving the status message and before receiving the power-on notification message. The configuration management device may include a plurality of 3rd generation partnership project-specific (or "3GPP-specific") parameters to automatically generate one or more files, and the automatically-generated file(s) may be used to activate the deployed network function(s) of vRANs. The network function(s) may initiate a Network Configuration (NETCONF) session with the configuration management device and the configuration management device may push the day-one configuration to a network function when the NETCONF session is successfully established. Additionally, the method may include sending a request to the configuration management device to generate and push radio unit (RU) configuration to the network function(s) of the network function controller upon receiving the power-on notification message. Also, the method may include sending, by the auto-commissioning server, a notification response and sharing the parent network function connectivity information to the RU of the cell site. The RU of the cell site may initiate radiation upon receiving the radio configuration from the network function(s) of the network function controller.

Accordingly, the techniques herein may use an auto-commissioning server for the auto-commissioning of vRANs. The auto-commissioning server may include an auto-commissioning engine coupled with a processor and a memory. The auto-commissioning engine may receive the plurality of parameters from the site controller of the cell site, the database, and the plurality of network entities. Further, the auto-commissioning engine may automatically generate the day zero configuration based on the received plurality of parameters. Additionally, the auto-commissioning engine may deploy the network function(s) of the vRANs in the cloud server based on the automatically generated day zero configuration. Also, the auto-commissioning engine may receive the power-on notification message from the RU of the cell site, and the power-on notification message may indicate that the RU of the cell site is ready for radio signal transmission. Further still, the auto-commissioning engine may activate the deployed network function(s) of the vRANs before transmitting a radio signal from the RU of the cell site.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

BRIEF DESCRIPTION OF DRAWINGS

Features, aspects and advantages of certain exemplary embodiments of the disclosure will be described below with reference to the accompanying drawings, in which like reference numerals denote like elements, and wherein.

DETAILED DESCRIPTION

Figure 1A:
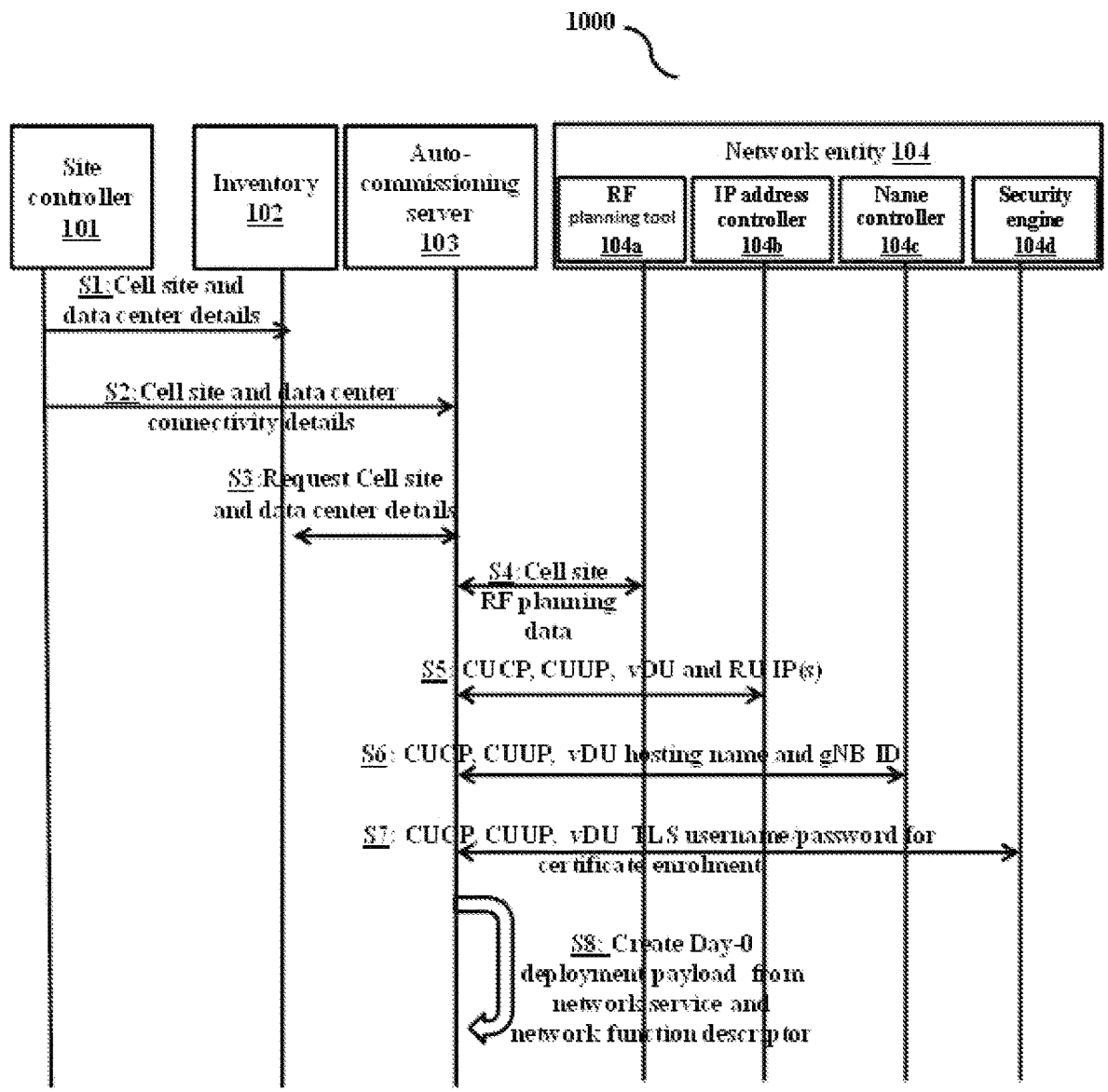
FIG. 1A, FIG. 1B, and FIG. 2 are sequential diagrams that illustrate signaling between different entities for virtualized Radio Access Network (vRAN) during an auto-commissioning process, in accordance with one or more example embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

According to aspects of one or more embodiments presented herein, a method and system may provide for the automatic commissioning (or "auto-commissioning") of virtualized Radio Access Networks (vRANs). The auto-commissioning feature may enable a virtualized approach to an Element Management System (EMS) that may be performed remotely, which eliminates a requirement for a physical visit to a cell site for commissioning the cell site. The auto-commissioning provides a "Plug and Play" approach that significantly reduces the commissioning process (e.g., in terms of minutes, etc.), which significantly reduces or eliminates operational costs of a mobile operator's balance sheet while requiring a limited number of network resource(s) and a limited amount of human labor to complete the commissioning on time.

Accordingly, embodiments herein disclose a method for auto-commissioning virtualized Radio Access Networks (vRANs). The method may include receiving, by an auto-commissioning server, a plurality of parameters from a site controller of a cell site, a database, and a plurality of network entities. Further, the method may include automatically generating, by the auto-commissioning server, a day zero configuration based on the received plurality of parameters. The day zero configuration may comprise a configuration required to deploy one or more network functions of vRANs over a cloud server. The network function(s) of vRANs may be at least one of cloud native, virtual, or containerized. In some embodiments, the day zero configuration comprises configuration of connection points (e.g., external interfaces and IPs of an associated network function), endpoint details of northbound systems, and images of the network function. Further, the method may include deploying, by the auto-commissioning server, the network function(s) of vRANs into the cloud server based on the automatically generated day zero configuration. Additionally, the method may include receiving, by the auto-commissioning server, a power-on notification message from a Radio Unit (RU) of the cell site, and the power-on notification message may indicate that the RU of the cell site is ready for radio signal transmission. Also, the method may include activating, by the auto-commissioning server, the deployed network function(s) of vRANs before transmitting a radio signal from the RU of the cell site.

Accordingly, embodiments herein disclose the auto-commissioning server for auto-commissioning of the vRANs. The auto-commissioning server may include an auto-commissioning engine coupled with a processor and a memory. The auto-commissioning engine may receive the plurality of parameters from the site controller of the cell site, the database, and the plurality of network entities. Further, the auto-commissioning engine may automatically generate the day zero configuration based on the received plurality of parameters. Further, the auto-commissioning engine may deploy the network function(s) of the vRANs in the cloud server based on the automatically generated day zero configuration. Additionally, the auto-commissioning engine may receive the power-on notification message from the RU of the cell site, and the power-on notification message may indicate that the RU of the cell site is ready for radio signal transmission. Also, the auto-commissioning engine may activate the deployed network function(s) of the vRANs before transmitting a radio signal from the RU of the cell site.

Unlike existing methods and systems, the proposed method provides an auto-commissioning feature, which enables a virtualized approach to Element Management System (EMS) that may be performed remotely, which eliminates a requirement for a physical visit to a cell site for commissioning the cell site. The auto-commissioning provides a "Plug and Play" approach that decreases the time of the commissioning process from weeks to hours, which significantly reduces or eliminates operational costs on a mobile operator's balance sheet and also requires less network resource(s) and requires less human labor to complete the commissioning on time.

Referring now to the drawings, and more particularly to FIGS. 1A through 5, where similar reference characters denote corresponding features consistently throughout the figures, these drawings provide exemplary embodiments.

Figure 1B:
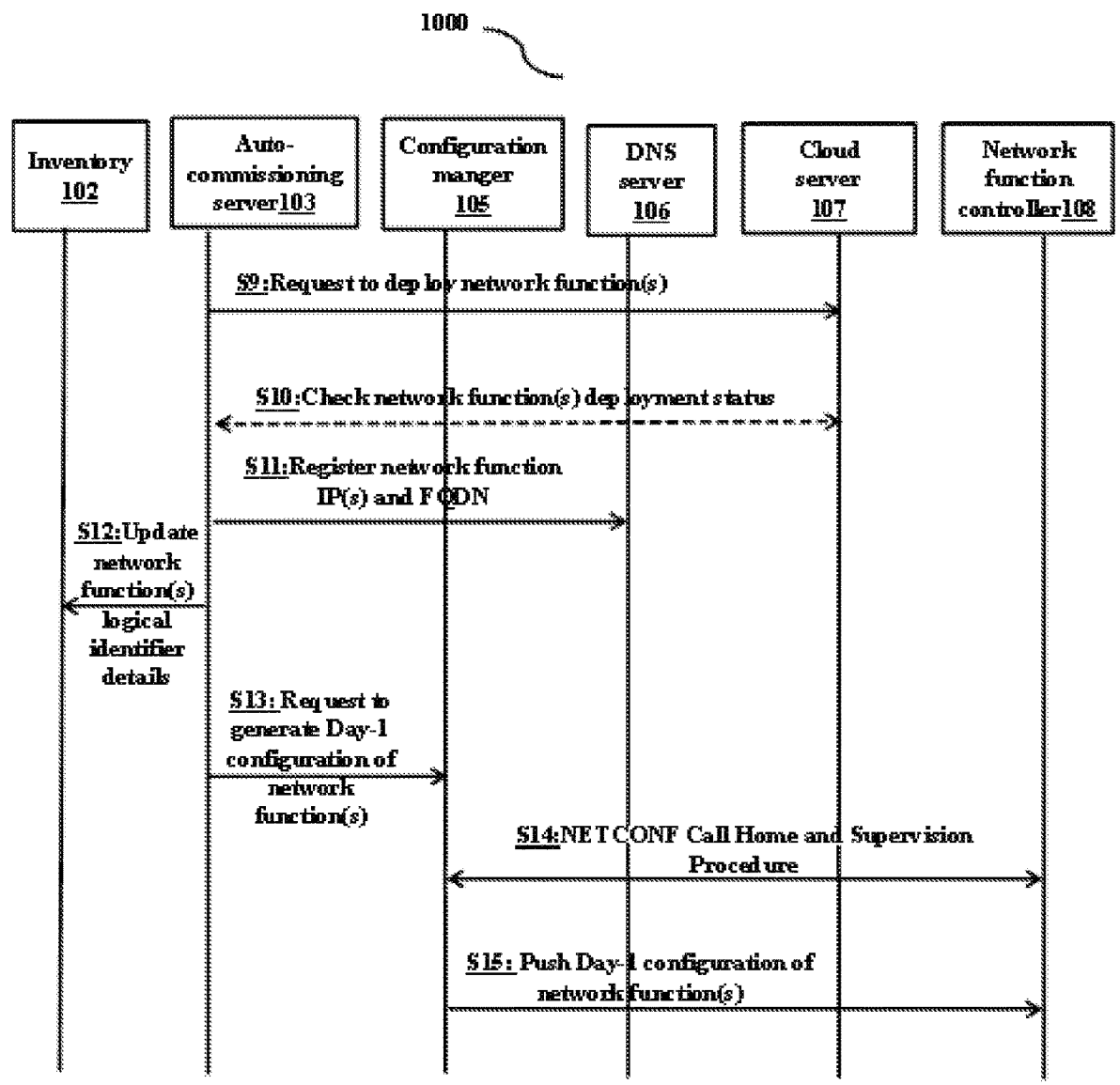
Figure 2:
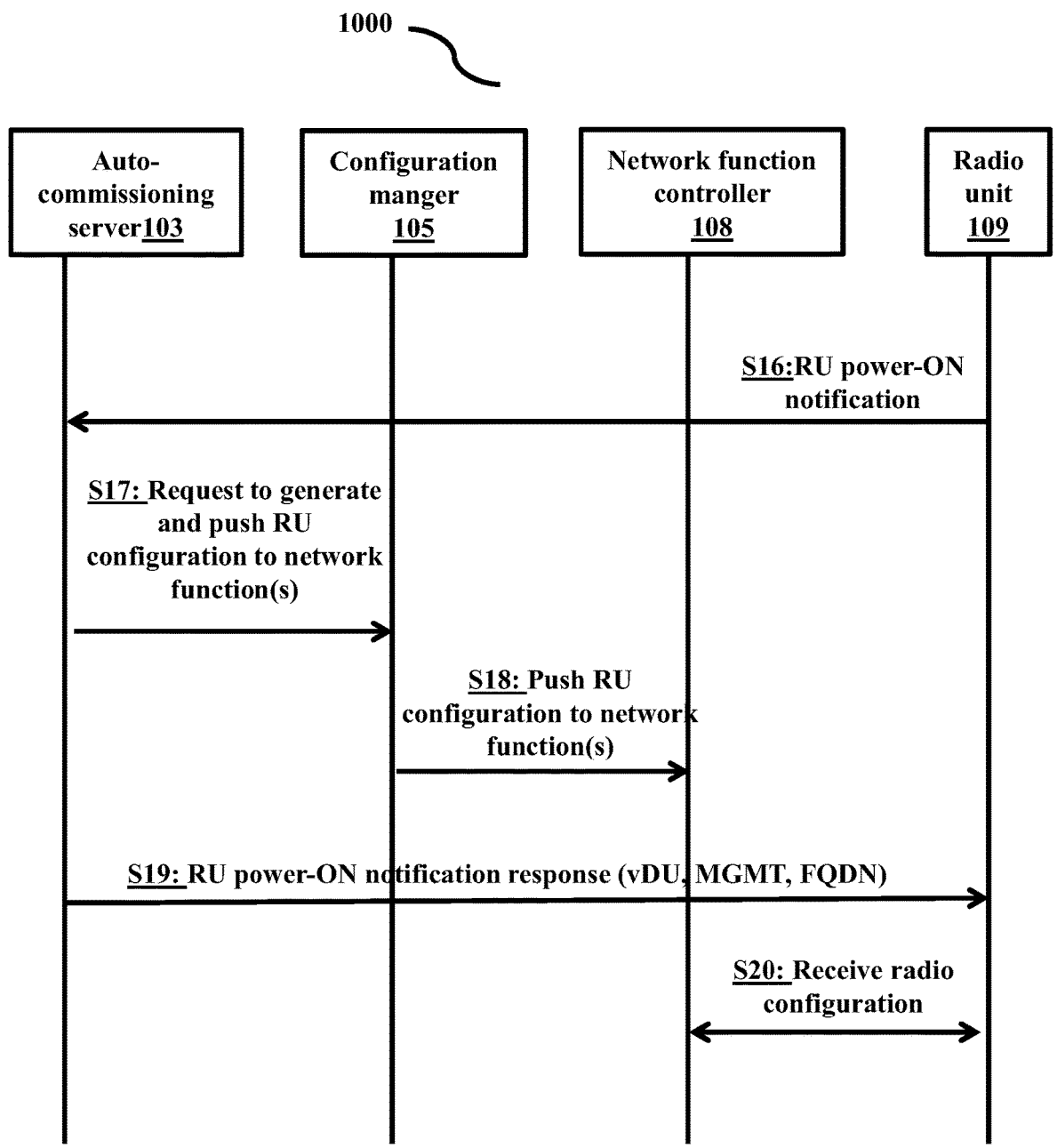

FIG. 1A, FIG. 1B, and FIG. 2 are sequential diagrams that illustrate signaling between different entities for a virtualized Radio Access Network (vRAN) auto-commissioning process, in accordance with one or more example embodiments.

In some embodiments, the auto-commissioning process includes (1) instantiation and configuration of network functions, as illustrated in sequential diagrams of FIGS. 1A-1B, and (2) configuration of Radio Unit, as illustrated in sequential diagram of FIG. 2.

FIGS. 1A-2 depict an exemplary "call flow," i.e., an exemplary set of functions, programs, subroutines, scripts, or a combination of such. The exemplary call flow of FIGS. 1A-2, in combination, represents an end-to-end auto-commissioning process (e.g., 5G macro vRAN auto-commissioning process). In some embodiments, the call flow represents a zero-touch provisioning of a 5G macro vRAN services in an automated way. The process includes steps (i.e., S1-S20) for commissioning a cell site so that the cell site is operational for one or more end customers. All network entities of a system 1000 involved in the vRAN auto-commissioning are integrated in a way that the flow of data happens automatically between all network entities and hence zero-touch provisioning of vRAN services is achieved.

In an embodiment, the system 1000 includes, but is not limited to, a site controller 101, an inventory 102, an auto-commissioning server 103, a network entity 104, a configuration management device 105 (i.e. configuration manager 105), a Domain Name System (DNS) server 106, a cloud server 107, a network function controller 108, and a Radio Unit (RU) 109. The network entity 104 includes a Radio Frequency (RF) planning tool 104a, an Internet Protocol (IP) address controller 104b, a name controller 104c, and a security engine 104d.

At step S1, the site controller 101 captures a plurality of parameters associated with the cell site and sends the plurality of parameters to the inventory 102, where the inventory 102 stores the plurality of parameters (e.g., first set of parameters, second set of parameters, third set of parameters, etc.). The plurality of parameters includes cell site information and datacenter information. The cell site information and the datacenter information include physical information associated with each network entity of the cell site and the datacenters. Some examples of the cell site information include cell site to datacenters connectivity details and cell site location information (e.g. latitude, longitude, etc.), a height of the cell site(s) and/or datacenters, a number of physical sectors present on a cell site, a type of antenna model installed on the cell site(s), a type of battery installed on the cell site(s), a Quick Response (QR) code or serial number associated with an antenna/battery model, Media Access Control (MAC) address of elements (e.g., radio devices, etc.) in the cell site, and any other suitable information.

At step S2, the site controller 101 sends connectivity information (e.g., dark fiber connectivity) associated with each cell site and the datacenter to the auto-commissioning server 103. The connectivity information is an essential feature for commissioning the cell site. Consider an example scenario in which the network (e.g., 5G network) includes around 10,000 datacenters. But each cell site can only have one dark fiber connection to a single datacenter. So, the connectivity information provides connectivity facts, for example, cell site "A" being connected to datacenter "1".

At step S3, the auto-commissioning server 103 sends a request to the inventory 102 for the cell site information and the datacenter information upon receiving the connectivity information from the site controller 101. In response to the request, the database provide the requested information to the auto-commissioning server 103.

At steps S4-S7, the auto-commissioning server 103 receives inputs (e.g., cell site planning data, IP address, unique hostnames, TLS credentials, etc.) from the network entity 104 (i.e. the RF planning tool 104a, the IP address controller 104b, the name controller 104c, and the security engine 104d) in order to begin automatic deployment of one or more V-RAN applications or one or more network functions (e.g. a Centralized Unit Control plane (CUCP), Centralized Unit User Plane (CUUP), and virtual Distributed Unit (vDU)).

At step S4, the auto-commissioning server 103 sends to the RF planning tool 104a a request for RF planning data, and Radio Unit (RU) mapping information with the network function(s). The RF planning data may include, but is not limited to, a Physical Cell Identifier (PCI) and Root Sequence Index (RSI), Tracking Area Code (TAC), azimuth, tilts, multiple-input and multiple-output (MIMO) configuration. The RF planning tool 104a sends to the auto-commissioning server 103 the requested RF planning data and the RU mapping information with the network function(s). In another embodiment, the auto-commissioning server 103 fetches the RF planning data and the RU mapping information with the network function(s) from the RF planning tool 104a. The auto-commissioning server 103 identifies the datacenter(s)/cluster where the network function(s) needs to be instantiated.

At step S5, the auto-commissioning server 103 sends a request to the IP address controller 104b to generate an IP address for the network function(s) and for the RU 109 of the cell site. The IP address is generated based on a selected datacenter for the deployment of the network function(s). The IP address controller 104b sends to the auto-commissioning server 103 the IP address generated for the network function(s) and the RU 109 of the cell site. In another embodiment, the auto-commissioning server 103 integrates with the IP address controller 104b to generate all IP addresses required for the network function(s) and the RU 109.

At step S6, the auto-commissioning server 103 sends a request to the name controller 104c to generate a unique hostname for the network function(s). The unique hostname (e.g., 14-character code) is generated based on a type of network function(s) and/or a type of the datacenter, and/or location information associated with the datacenter. The name controller 104c sends the unique hostname for the network function(s) to the auto-commissioning server 103. In another embodiment, the auto-commissioning server 103 integrates with the name controller 104c to generate the unique hostname for the network function(s) and a gNodeB ID for vRAN network service.

At step S7, the auto-commissioning server 103 sends a request to the security engine 104d to generate a unique Transport Layer Security (TLS) username and password, and enroll a certificate for secure access to the V-RAN application(s). In response, the security engine 104d generates and sends the unique TLS username and password to the auto-commissioning server 103. In another embodiment, the auto-commissioning server 103 integrates with the security engine 104d to generate the unique TLS username and password required for the certificate enrollment process. The certificate is automatically installed for the network function(s).

At step S8, the auto-commissioning server 103 automatically generates a day zero configuration based on the received plurality of parameters (e.g., parameters receive from steps S4 to S7). The day zero configuration is generated using a descriptor or a template that has been previously defined in the auto-commissioning server 103 for each of these services. For example, in the CUCP or CUUP services, the auto-commissioning server 103 takes all the inputs/ dynamic parameters (e.g., parameters obtained via steps S4 to S7) and fills them (inputs/dynamic parameters) into those templates in an automated manner. With respect to a dynamic parameter, dynamic may refer to a situation in which in every instance of network function, a parameter may vary and may be generated by the auto-commissioning server. So, one of the benefits of the proposed method is that the vendor/cell site engineer/user does not need to develop templates every time, such as if 10,000 CUCP need to be instantiated in the network. The vendor/cell site engineer/user does not need to change data in the descriptors that are created once and will be reused as a template for any subsequent CUCP or CUUP services/deployments.

At step S9, the auto-commissioning server 103 sends a request to the cloud server 107 to deploy the network function(s). The network function(s) handled/managed by a cloud service provider.

At step S10, the auto-commissioning server 103 monitors a status of the deployment of the network function(s). Specifically, the auto-commissioning server 103 receives the status message from the cloud server 107. The status message includes indication of a successful deployment of the network function(s) and/or a deployment failure of the network function(s).

At step S11, the auto-commissioning server 103 then automatically registers the plurality of generated IP addresses of the network function(s) and the associated Fully Qualified Domain Name (FQDN) in the DNS server 106. In general, to connect with the network, all IPs associated with the network (core-network) function(s)/V-RAN application(s) must be registered/approved. The above-mentioned registration process is done manually in the conventional methods/systems, while the proposed method and system have an automatic registration feature that saves time and resources.

At step S12, the auto-commissioning server 103 sends a request to the inventory 102 to store updated information for the successful deployment of the network function(s), where the updated information includes the status message along with a logical identifier (e.g., FQDN, the unique hostname, etc.) related to the network function(s).

At steps S13-S15, the auto-commissioning server 103 sends a request to the configuration management device 105 to generate a day-one configuration of the network function based on receiving the status message (i.e., successfully deployment/successfully running). The day-one configuration comprises a configuration that is required to render the virtualized/containerized network function fully operational. In some embodiments, the day-one configuration comprises external IP related configurations, GNODEB ID, ECGI Values, Mobility related configuration, bandwidth part (BWP) and/or carrier frequently related configuration. One or more network functions initiate one or more Network Configuration Protocol (NETCONF) sessions (e.g., NETCONF call home and supervision procedures) with the configuration management device 105, and the configuration management device 105 pushes the day-one configuration to the network function controller 108 upon successfully establishing the NETCONF. The configuration management device 105 contains a number of $3^{rd}$ generation partnership project-specific (or "3GPP-specific") parameters (e.g., yang file, 3GPP-specific libraries) that are used to automatically build a file (e.g., an XML file) that is used to activate the deployed network function(s) of vRANs. In the existing methods/systems, the vendor/cell site engineer/user must manually generate the file, whereas in the proposed method and system, the vendor/cell site engineer/user may upload a plurality of 3GPP-specific parameters (e.g., yang file, 3GPP-specific libraries), which may be a one-time input, to the configuration management device 105 to generate the file/multiple files based on requirements.

At steps S16-S18, the auto-commissioning server 103 receives a power-on notification message from the RU 109 of the cell site. This power-on notification message may generate when a cell site engineer provides a power supply to the cell site for radiating. The auto-commissioning server 103 then sends a request to the configuration management device 105 to generate and push a radio configuration to the network function(s) of the network function controller 108 upon receiving the power-on notification message.

At steps S19-S20, the auto-commissioning server 103 sends a notification response by sharing the parent network functional connectivity information (e.g., vDU, MGMT, FQDN) to the RU 109 of the cell site, and the RU 109 of the cell site initiates radiation upon receiving the radio configuration from the network function(s) of the network function controller 108.

Figure 3:
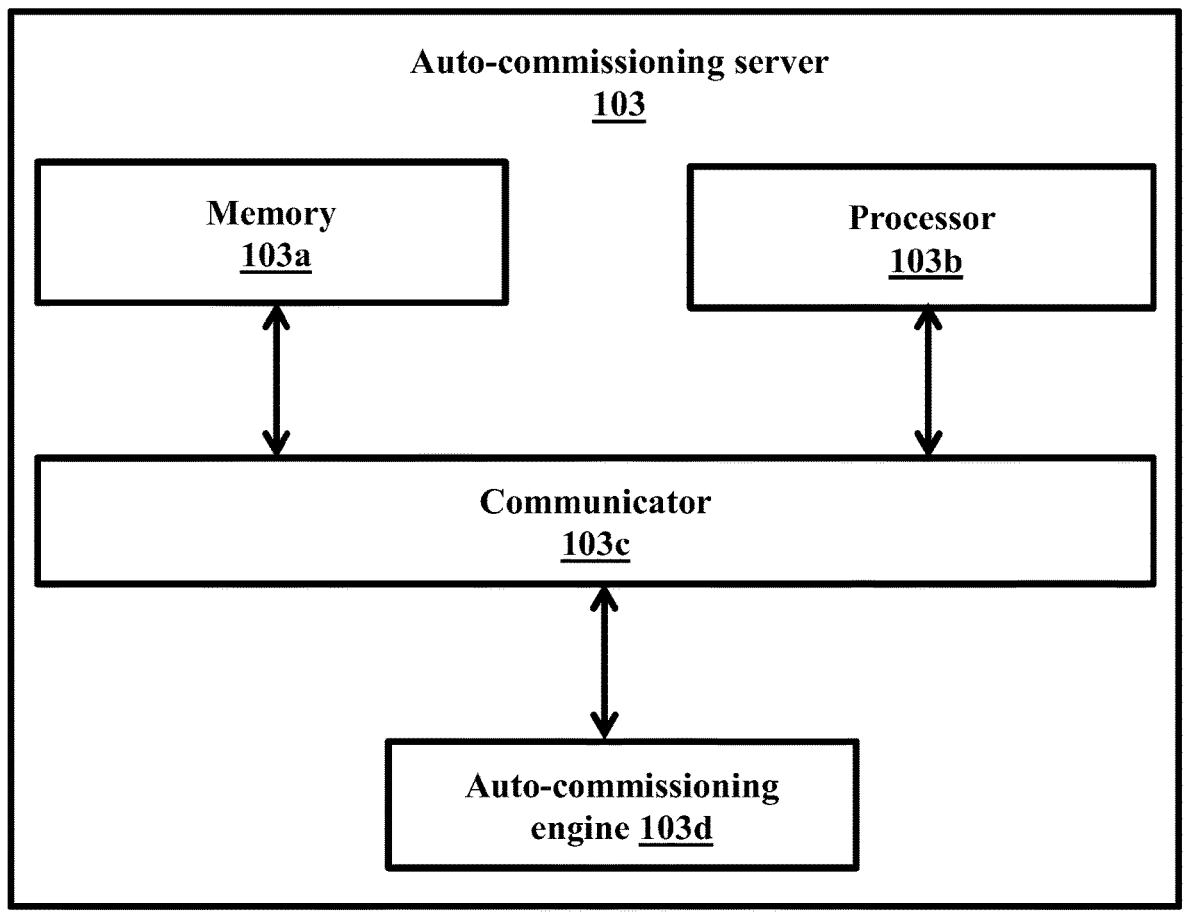
FIG. 3 illustrates a block diagram of an auto-commissioning server for the vRAN auto-commissioning process, according to an embodiment as disclosed herein.

FIG. 3 illustrates a block diagram of the auto-commissioning server 103 for the vRAN auto-commissioning process, according to an embodiment as disclosed herein.

In an embodiment, the auto-commissioning server 103 includes a memory 103a, a processor 103b, a communicator 103c, and an auto-commissioning engine 103d.

In an embodiment, the memory 103a stores the plurality of parameters (e.g., cell site information, datacenter information, connectivity information), the day zero configuration, etc. The memory 103a stores instructions to be executed by the processor 103b. In some embodiments, the memory 103a stores instructions which, when executed by the processor 103b, allow the processor 103b to act as a cloud orchestrator and to perform one or more of the associated steps as described in relation to FIG. 1A, FIG. 1B and FIG. 2. The memory 103a may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 103a may, in some examples, be considered a non-transitory storage medium. The term "non-transitory" may indicate that the storage medium is not embodied in a carrier wave or a propagated signal. However, the term "non-transitory" should not be interpreted that the memory 103a is non-movable. In some examples, the memory 103a can be configured to store larger amounts of information than the memory. In certain examples, a non-transitory storage medium may store data that can, over time, change (e.g., in Random Access Memory (RAM) or cache). The memory 103a can be an internal storage unit or it can be an external storage unit of the auto-commissioning server 103, a cloud storage, or any other type of external storage.

The processor 103b communicates with the memory 103a, the communicator 103c, and the auto-commissioning engine 103d. The processor 103b is configured to execute instructions stored in the memory 103a and to perform various processes. The processor 103b may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator 103c is configured for communicating internally between internal hardware components and with external devices (e.g., database, cloud server, etc.) via one or more networks (e.g. Radio technology). The communicator 103c includes an electronic circuit specific to a standard that enables wired or wireless communication.

The auto-commissioning engine 103d is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the auto-commissioning engine 103d receives the plurality of parameters from the site controller 101 of the cell site, the inventory 102, and the plurality of network entities 104.

The auto-commissioning engine 103d receives the first set of parameters of the plurality of parameters from the site controller 101. The first set of parameters includes the connectivity information associated with the cell site associated with the site controller 101 and the datacenter. The first set of parameters is stored in the inventory 102.

The auto-commissioning engine 103d receives the second set of parameters of the plurality of parameters from the inventory 102. The second set of parameters includes the cell site information and the datacenter information. The cell site information and the datacenter information include the logical identifier associated with each network entity of the cell site associated with the site controller 101 and the datacenter, and the physical information associated with each network entity of the cell site associated with the site controller 101 and the datacenter. The second set of parameters is stored in the inventory 102.

The auto-commissioning engine 103d receives the third set of parameters of the plurality of parameters from the plurality of network entities 104. The plurality of network entities 104 includes the RF planning tool 104a, the IP address controller 104b, the name controller 104c, and the security engine 104d. Furthermore, the auto-commissioning engine 103d receives the RF planning data and the RU mapping information with the network function(s) from the RF planning tool 104a. The network function(s) includes the CUCP, CUUP, and vDU and the auto-commissioning server 103 identifies the inventory 102 and the cloud server 107 where the network function(s) to be instantiated, and where the RF planning data includes the PCI and the RSS.

Furthermore, the auto-commissioning engine 103d receives the plurality of IP addresses for the network function(s) and the RU 109 of the cell site from the IP address controller 104b. The plurality of IP addresses is generated based on the selected inventory 102 for the deployment of the network function(s). Furthermore, the auto-commissioning engine 103d receives the unique hostname for the network function(s) from the name controller 104c. The unique hostname is generated based on the type of network function and/or the type of the inventory 102, and/or the location information associated with the inventory 102. Furthermore, the auto-commissioning engine 103d receives the unique TLS username and password to enroll the certificate from the security engine 104d. The certificate is automatically installed for the network function(s).

In an embodiment, the auto-commissioning engine 103d automatically generates the day zero configuration based on the received plurality of parameters (i.e., the first set of parameters, the second set of parameters, the third set of parameters, etc.)

In an embodiment, the auto-commissioning engine 103d deploys the network function(s) of the vRANs in the cloud server 107 based on the automatically generated day zero configuration. The auto-commissioning engine 103d sends the request to the cloud server 107 to deploy the network function(s). The auto-commissioning engine 103d deploys the network function into the cloud server 107. The auto-commissioning engine 103d receives the status message from the cloud server 107. The status message includes indication of the successful deployment of the network function(s) or the deployment failure of the network function(s), or the deployment termination of the network function(s).

In an embodiment, the auto-commissioning engine 103d automatically registers the plurality of generated IP addresses of the network function(s) and the associated FQDN in the DNS server 106. The auto-commissioning engine 103d sends the updated information to the inventory 102 to store the updated information. The updated information includes the status message along with the logical identifier related to the network function(s).

In an embodiment, the auto-commissioning engine 103d receives the power-on notification message from the RU 109 of the cell site. The power-on notification message indicates that the RU 109 of the cell site is ready for radio signal transmission.

In an embodiment, the auto-commissioning engine 103d activates the deployed network function(s) of the vRANs before transmitting a radio signal from the RU 109 of the cell site. The auto-commissioning engine 103d sends the request to the configuration management device 105 to generate the day-one configuration of the network function(s) based on receiving the status message and upon receiving the power-on notification message. The configuration management device 105 includes a plurality of 3GPP-specific parameters to automatically generate the file(s). The automatically-generated file(s) is used to activate the deployed network function(s) of vRANs. The network function(s) initiates the NETCONF session with the configuration management device 105, where the configuration management device 105 pushes the day-one configuration to the network function controller 108 when the NETCONF session is successfully established.

The auto-commissioning engine 103d sends the request to the configuration management device 105 to generate and push the radio (RU) configuration to the network function(s) of the network function controller 108 upon receiving the power-on notification message. The auto-commissioning engine 103d sends the notification response and shares the parent network function connectivity information to the RU 109 of the cell site. The RU 109 of the cell site initiates radiation upon receiving the radio configuration from the network function(s) of the network function controller 108.

Although the FIG. 3 shows various hardware components of the auto-commissioning server 103 but it is to be understood that other embodiments are not limited thereon. In other embodiments, the auto-commissioning server 103 may include less or more number of components. Further, the labels or names of the components are used only for illustrative purpose and does not limit the scope of the invention. One or more components can be combined to perform the same or substantially similar function for the auto-commission of the vRANs.

Figure 4:
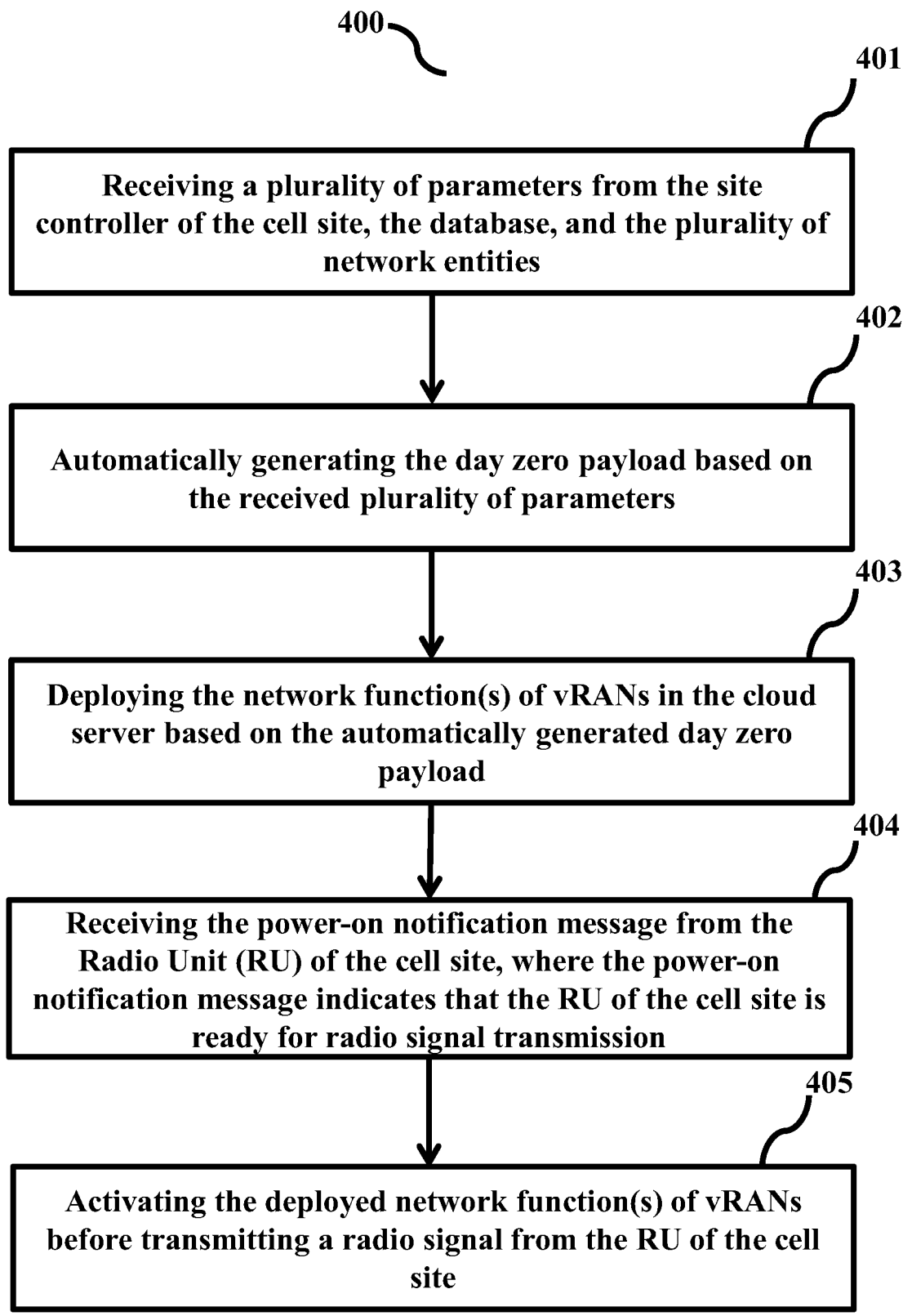
FIG. 4 is a flow diagram illustrating a method for the vRAN auto-commissioning process, in accordance with one or more example embodiments.

FIG. 4 is a flow diagram 400 illustrating a method for the vRAN auto-commissioning process, in accordance with one or more example embodiments. The steps 401 to 405 may be performed by the auto-commissioning server 103 for the auto-commissioning of vRANs.

At step 401, the method includes receiving the plurality of parameters from the site controller 101 of the cell site, the inventory 102, and the plurality of network entities 104. At step 402, the method includes automatically generating the day zero configuration based on the received plurality of parameters. At step 403, the method includes deploying the network function(s) of the vRANs in the cloud server 107 based on the automatically generated day zero configuration. At step 404, the method includes receiving the power-on notification message from the RU 109 of the cell site. The power-on notification message indicates that the RU 109 of the cell site is ready for radio signal transmission. At step 405, the method includes activating the deployed network function(s) of the vRANs before transmitting a radio signal from the RU 109 of the cell site.

The various actions, acts, blocks, steps, or the like in the flow diagram 400 may be performed in the order presented, in a different order, or simultaneously. Further, in some embodiments, some of the actions, acts, blocks, steps, or the like may be omitted, added, modified, skipped, or the like without departing from the scope of the invention.

Figure 5:
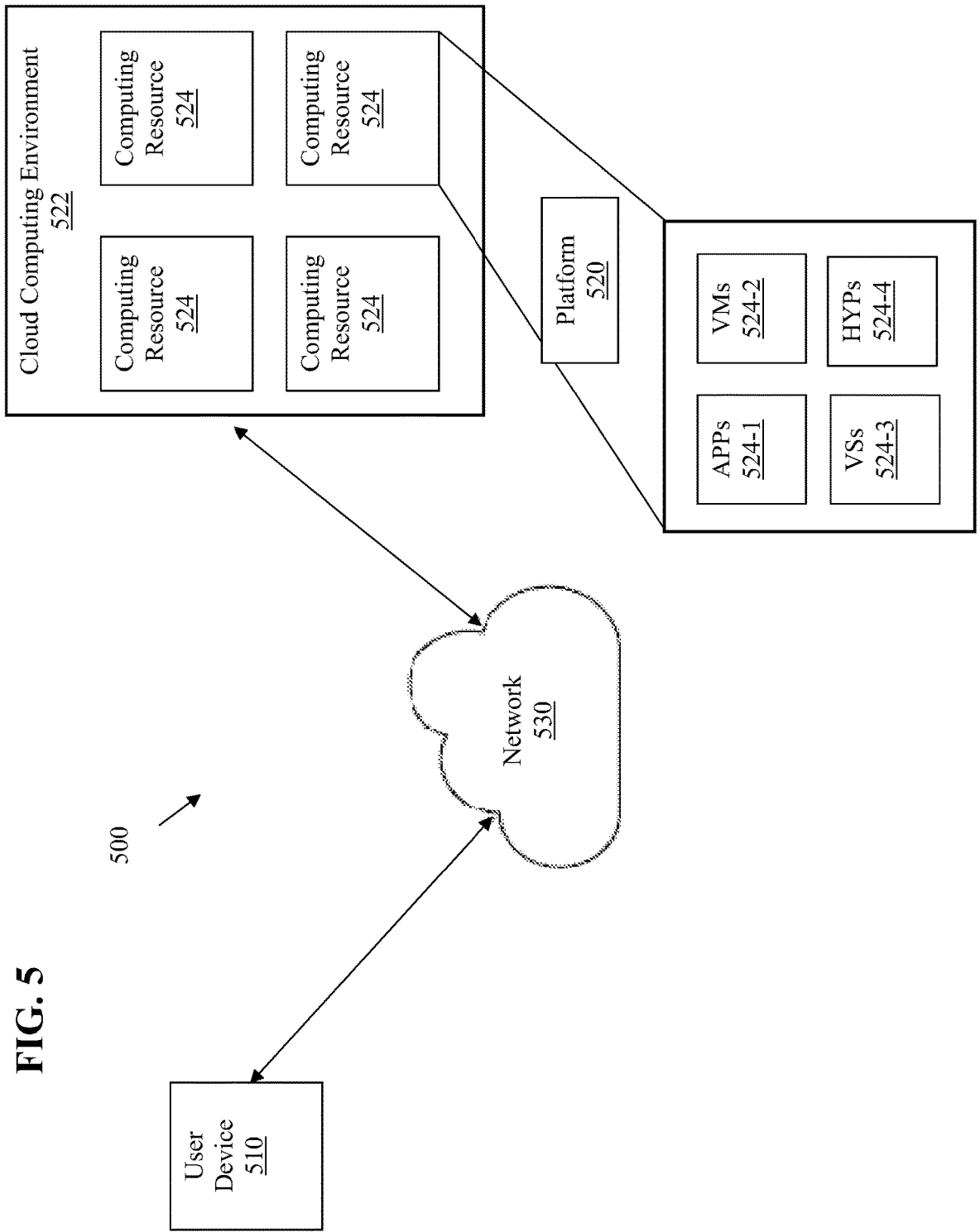
FIG. 5 is a diagram of an example environment in which a method and system described herein, may be implemented.

FIG. 5 is a diagram of an example environment 500 in which systems and/or methods, described herein, may be implemented. As shown in FIG. 5, environment 500 may include a user device 510, a platform 520, and a network 530. Devices of environment 500 may interconnect via wired connections, wireless connections, or a combination of wired and wireless connections. In embodiments, any of the functions and operations described with reference to FIGS. 1 through 4 above may be performed by any combination of elements illustrated in FIG. 5.

User device 510 includes one or more devices capable of receiving, generating, storing, processing, and/or providing information associated with platform 520. For example, user device 510 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 510 may receive information from and/or transmit information to platform 520.

Platform 520 includes one or more devices capable of receiving, generating, storing, processing, and/or providing information. In some implementations, platform 520 may include a cloud server or a group of cloud servers. In some implementations, platform 520 may be designed to be modular such that certain software components may be swapped in or out depending on a particular need. As such, platform 520 may be easily and/or quickly reconfigured for different uses.

In some implementations, as shown, platform 520 may be hosted in cloud computing environment 522. Notably, while implementations described herein describe platform 520 as being hosted in cloud computing environment 522, in some implementations, platform 520 may not be cloud-based (i.e., may be implemented outside of a cloud computing environment) or may be partially cloud-based.

Cloud computing environment 522 includes an environment that hosts platform 520. Cloud computing environment 522 may provide computation, software, data access, storage, etc., services that do not require end-user (e.g., user device 510) knowledge of a physical location and configuration of system(s) and/or device(s) that hosts platform 520. As shown, cloud computing environment 522 may include a group of computing resources 524 (referred to collectively as "computing resources 524" and individually as "computing resource 524").

Computing resource 524 includes one or more personal computers, a cluster of computing devices, workstation computers, server devices, or other types of computation and/or communication devices. In some implementations, computing resource 524 may host platform 520. The cloud resources may include compute instances executing in computing resource 524, storage devices provided in computing resource 524, data transfer devices provided by computing resource 524, etc. In some implementations, computing resource 524 may communicate with other computing resources 524 via wired connections, wireless connections, or a combination of wired and wireless connections.

As further shown in FIG. 5, computing resource 524 includes a group of cloud resources, such as one or more applications ("APPs") 524-1, one or more virtual machines ("VMs") 524-2, virtualized storage ("VSs") 524-3, one or more hypervisors ("HYPs") 524-4, or the like.

Application 524-1 includes one or more software applications that may be provided to or accessed by user device 510. Application 524-1 may eliminate a need to install and execute the software applications on user device 510. For example, application 524-1 may include software associated with platform 520 and/or any other software capable of being provided via cloud computing environment 522. In some implementations, one application 524-1 may send/receive information to/from one or more other applications 524-1, via virtual machine 524-2.

Virtual machine 524-2 includes a software implementation of a machine (e.g., a computer) that executes programs like a physical machine. Virtual machine 524-2 may be either a system virtual machine or a process virtual machine, depending upon use and degree of correspondence to any real machine by virtual machine 524-2. A system virtual machine may provide a complete system platform that supports execution of a complete operating system ("OS"). A process virtual machine may execute a single program, and may support a single process. In some implementations, virtual machine 524-2 may execute on behalf of a user (e.g., user device 510), and may manage infrastructure of cloud computing environment 522, such as data management, synchronization, or long-duration data transfers.

Virtualized storage 524-3 includes one or more storage systems and/or one or more devices that use virtualization techniques within the storage systems or devices of computing resource 524. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 524-4 may provide hardware virtualization techniques that allow multiple operating systems (e.g., "guest operating systems") to execute concurrently on a host computer, such as computing resource 524. Hypervisor 524-4 may present a virtual operating platform to the guest operating systems, and may manage the execution of the guest operating systems. Multiple instances of a variety of operating systems may share virtualized hardware resources.

Network 530 includes one or more wired and/or wireless networks. For example, network 530 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
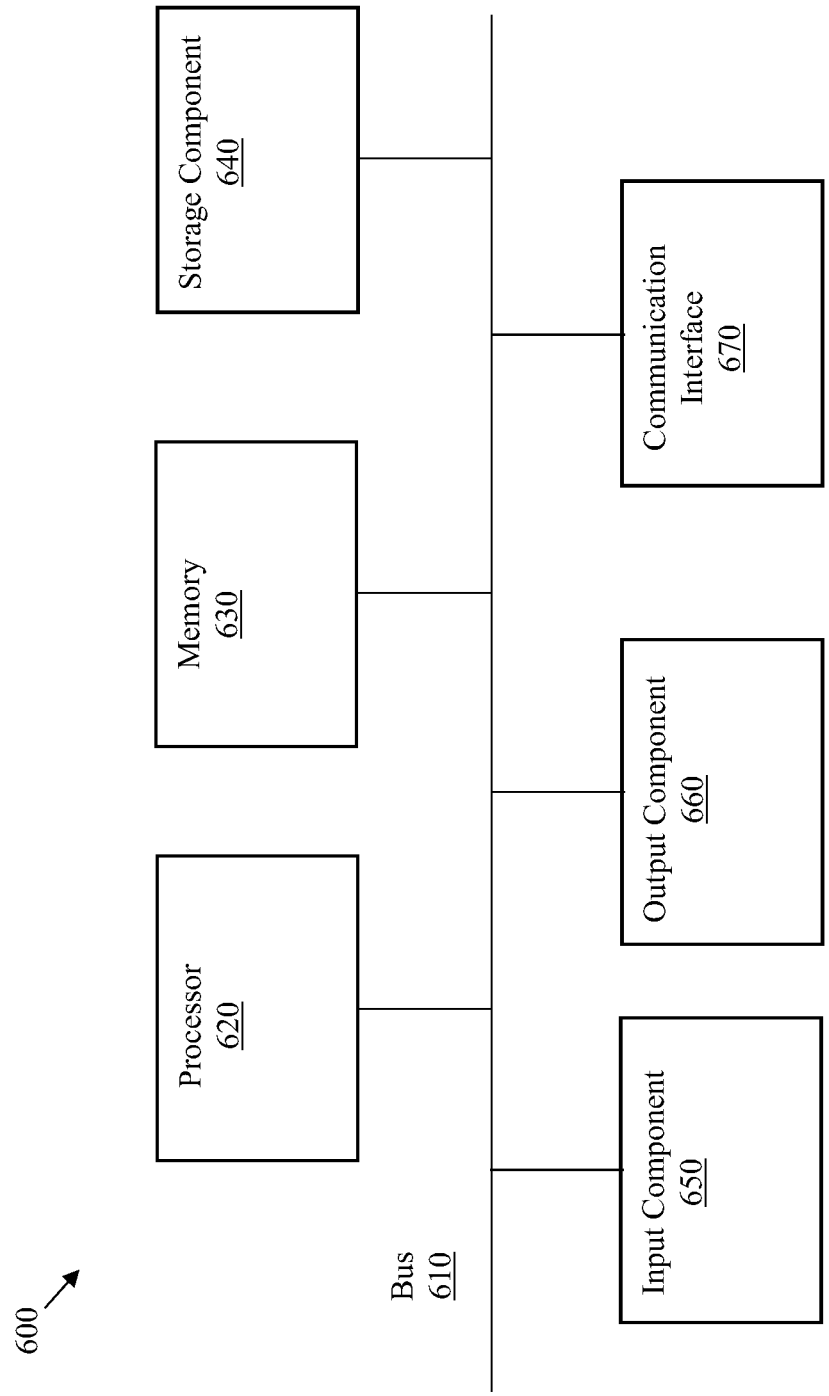
FIG. 6 illustrates a diagram of components of one or more devices, in accordance with one or more example embodiments.

FIG. 6 is a diagram of example components of a device 600. Device 600 may correspond, e.g., to user device 510 and/or platform 520. As shown in FIG. 6, device 600 may include a bus 610, a processor 620, a memory 630, a storage component 640, an input component 650, an output component 660, and a communication interface 670.

Bus 610 includes a component that permits communication among the components of device 600. Processor 620 may be implemented in hardware, firmware, or a combination of hardware and software. Processor 620 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 includes one or more processors capable of being programmed to perform a function. Memory 630 includes a random access memory (RAM), a read only memory (ROM), and/or another type of dynamic or static storage device (e.g., a flash memory, a magnetic memory, and/or an optical memory) that stores information and/or instructions for use by processor 620.

Storage component 640 stores information and/or software related to the operation and use of device 600. For example, storage component 640 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 650 includes a component that permits device 600 to receive information, such as via user input (e.g., a touch screen display, a keyboard, a keypad, a mouse, a button, a switch, and/or a microphone). Additionally, or alternatively, input component 650 may include a sensor for sensing information (e.g., a global positioning system (GPS) component, an accelerometer, a gyroscope, and/or an actuator). Output component 660 includes a component that provides output information from device 600 (e.g., a display, a speaker, and/or one or more light-emitting diodes (LEDs)).

Communication interface 670 includes a transceiver-like component (e.g., a transceiver and/or a separate receiver and transmitter) that enables device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, or the like.

Device 600 may perform one or more processes described herein. Device 600 may perform these processes in response to processor 620 executing software instructions stored by a non-transitory computer-readable medium, such as memory 630 and/or storage component 640. A computer-readable medium is defined herein as a non-transitory memory device. A memory device includes memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

In embodiments, any one of the operations or processes of FIGS. 1 through 4 may be implemented by or using any one of the elements illustrated in FIGS. 5 and 6.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for auto-commissioning of virtualized Radio Access Networks (vRANs) by an auto-commissioning server, the method comprises:
   receiving, by the auto-commissioning server, a plurality of parameters from a site controller of a cell site, an inventory, and a plurality of network entities;
   automatically generating, by the auto-commissioning server, a day zero configuration based on the received plurality of parameters;
   deploying, by the auto-commissioning server, at least one network function of the vRANs into a cloud server based on the automatically generated day zero configuration;
   receiving, by the auto-commissioning server, a power-on notification message from a Radio Unit (RU) of the cell site, wherein the power-on notification message indicates that the RU of the cell site is ready for radio signal transmission; and activating, by the auto-commissioning server, the at least one deployed network function of the vRANs before transmitting a radio signal from the RU of the cell site.

2. The method as claimed in claim 1, wherein receiving, by the auto-commissioning server, the plurality of parameters from the site controller comprises:

receiving, by the auto-commissioning server, a first set of parameters of the plurality of parameters from the site controller, wherein the first set of parameters comprises connectivity information associated with at least one of the cell site associated with the site controller and a datacenter, wherein the first set of parameters is stored in the inventory.

3. The method as claimed in claim 1, wherein receiving, by the auto-commissioning server, the plurality of parameters from the inventory comprises:

receiving, by the auto-commissioning server, a second set of parameters of the plurality of parameters from the inventory, wherein the second set of parameters comprises at least one of cell site information and datacenter information, wherein the cell site information and the datacenter information comprising at least one of a logical identifier associated with each network entity of the at least one of the cell site associated with the site controller and the datacenter, and physical information associated with each network entity of the at least one of the cell site associated with the site controller and the datacenter, wherein the second set of parameters is stored in the inventory.

4. The method as claimed in claim 1, wherein receiving, by the auto-commissioning server, the plurality of parameters from the plurality of network entities comprises:

receiving, by the auto-commissioning server a third set of parameters of the plurality of parameters from the plurality of network entities, wherein the plurality of network entities comprises a radio frequency (RF) planning tool, an internet protocol (IP) address controller, a name identifier, and a security engine.

5. The method as claimed in claim 4, wherein receiving, by the auto-commissioning server the third set of parameters of the plurality of parameters from the plurality of network entities comprises:

receiving, by the auto-commissioning server, a radio frequency (RF) planning data and a radio unit (RU) mapping information with the at least one network function from the RF planning tool, wherein the least one network function comprises a centralized unit control plane (CUCP), centralized unit user plane (CUUP), and virtual distributed unit (vDU), wherein the auto-commissioning server identifies the inventory and the cloud server where the network function to be instantiated, wherein the RF planning data comprises a physical cell identifier (PCI) and Received signal strength (RSS);

receiving, by the auto-commissioning server, a plurality of ip addresses for the at least one network function and the RU 109 of the cell site from the IP address controller, wherein the plurality of IP addresses is generated based on a selected inventory for deployment of the least one network function;

receiving, by the auto-commissioning server, a unique hostname for the at least one network function and the cell site from the name identifier, wherein the unique hostname is generated based on at least one of a type of network function, a type of the inventory, and location information associated with the inventory; and receiving, by the auto-commissioning server, a unique transport layer security (TLS) user name and password to enroll a certificate from a security engine, wherein the certificate is automatically installed for the at least one network function.

6. The method as claimed in claim 1, wherein deploying, by the auto-commissioning server, the at least one network function into the cloud server based on the automatically generated day zero configuration comprises:

sending, by the auto-commissioning server, a request to the cloud server to deploy the at least one network function;

deploying, by the auto-commissioning server, the at least one network function into the cloud server; and receiving, by the auto-commissioning server, a status message from the cloud server, wherein the status comprises at least one of a successful deployment of the at least one network function, a deployment failure of the at least one network function, and a deployment termination of the at least one network function.

7. The method as claimed in claim 1, further comprising:

automatically registering, by the auto-commissioning server, a plurality of generated IP addresses of the at least one network function and associated fully qualified domain name (FQDN) in a domain name system (DNS) server; and sending, by the auto-commissioning server, updated information to the inventory to store the updated information, wherein the updated information comprises a status message along with a logical identifier related to the at least one network function.

8. The method as claimed in claim 1, wherein activating, by the auto-commissioning server, the at least one deployed network function of the vRANs before radiating of the RU of the cell site comprises:

sending, by the auto-commissioning server, a request to a configuration management device to generate a day-one configuration of the at least one network function based on a status message and the power-on notification message, wherein the configuration management device comprises a plurality of third Generation Partnership Project (3GPP)-specific parameters to automatically generate at least one file, wherein the at least one automatically-generated file is used to activate the at least one deployed network function of vRANs, wherein the at least one network function initiates a Network Configuration Protocol (NETCONF) session with the configuration management device and the configuration management device pushes the day-one configuration to a network function controller when the NETCONF session successfully established;

sending, by the auto-commissioning server, a request to the configuration management device to generate and push radio unit (RU) configuration to the at least one network function of the network function controller upon receiving the power-on notification message;

sending, by the auto-commissioning server, a notification response by sharing the parent network function connectivity information to the RU of the cell site, wherein the RU of the cell site initiates radiation upon receiving the radio configuration from the at least one network function of the network function controller.

9. An auto-commissioning server for auto-commissioning of virtualized Radio Access Networks (vRANs), comprising:

a memory storing instructions;
an auto-commissioning engine comprising at least one processor configured to execute the instructions to:
receive a plurality of parameters from a site controller of a cell site, an inventory, and a plurality of network entities;
automatically generate a day zero configuration based on the received plurality of parameters;
deploy at least one network function of the vRANs into a cloud server based on the automatically generated day zero configuration;
receive a power-on notification message from a Radio Unit (RU) of the cell site, wherein the power-on notification message indicates that the RU of the cell site is ready for radio signal transmission; and
activate the at least one deployed network function of the vRANs before transmitting a radio signal from the RU of the cell site.

10. The auto-commissioning server as claimed in claim 9, wherein the at least one processor is further configured to execute the instructions to:
receive a first set of parameters of the plurality of parameters from the site controller, wherein the first set of parameters comprises connectivity information associated with at least one of the cell site associated with the site controller and a datacenter, wherein the first set of parameters is stored in the inventory.

11. The auto-commissioning server as claimed in claim 9, wherein the at least one processor is further configured to:
receive a second set of parameters of the plurality of parameters from the inventory, wherein the second set of parameters comprises at least one of cell site information and datacenter information, wherein the cell site information and the datacenter information comprising at least one of a logical identifier associated with each network entity of the at least one of the cell site associated with the site controller and the datacenter, and physical information associated with each network entity of the at least one of the cell site associated with the site controller and the datacenter, wherein the second set of parameters is stored in the inventory.

12. The auto-commissioning server as claimed in claim 9, wherein the at least one processor is further configured to:
receive a third set of parameters of the plurality of parameters from the plurality of network entities, wherein the plurality of network entities comprises a Radio frequency (RF) planning tool, an Internet Protocol (IP) address controller, a name identifier, and a security engine.

13. The auto-commissioning server as claimed in claim 12, wherein the at least one processor is further configured to:
receive a Radio frequency (RF) planning data and a Radio Unit (RU) mapping information with the at least one network function from the RF planning tool, wherein the least one network function comprises a Centralized Unit Control plane (CUCP), Centralized Unit User Plane (CUUP), and virtual Distributed Unit (vDU), wherein the auto-commissioning server identifies the inventory and the cloud server where the network function to be instantiated, wherein the RF planning data comprises a Physical Cell Identifier (PCI) and Received signal strength (RSS);
receive, by the auto-commissioning server, a plurality of IP addresses for the at least one network function and the RU of the cell site from the IP address controller, wherein the plurality of IP addresses is generated based on a selected inventory for deployment of the least one network function;
receive, by the auto-commissioning server, a unique hostname for the at least one network function and the cell site from the name identifier, wherein the unique hostname is generated based on at least one of a type of network function, a type of the inventory, and location information associated with the inventory; and
receive, by the auto-commissioning server, a unique Transport Layer Security (TLS) user name and password to enroll a certificate from a security engine, wherein the certificate is automatically installed for the at least one network function.

14. The auto-commissioning server as claimed in claim 9, wherein the at least one processor is further configured to:
send a request to the cloud server to deploy the at least one network function;
deploy the at least one network function into the cloud server; and
receive a status message from the cloud server, wherein the status comprises at least one of a successful deployment of the at least one network function, a deployment failure of the at least one network function, and a deployment termination of the at least one network function.

15. The auto-commissioning server as claimed in claim 9, wherein the auto-commissioning server is configured to:
automatically register a plurality of generated IP addresses of the at least one network function and associated Fully Qualified Domain Name (FQDN) in a Domain Name System (DNS) server; and
send updated information to the inventory to store the updated information, wherein the updated information comprises a status message along with a logical identifier related to the at least one network function.

16. The auto-commissioning server as claimed in claim 9, wherein the at least one processor is further configured to:
send a request to a configuration management device to generate a day-one configuration of the at least one network function based on a status message and the power-on notification message, wherein the configuration management device comprises a plurality of third Generation Partnership Project (3GPP)-specific parameters to automatically generate at least one file, wherein the at least one automatically-generated file is used to activate the at least one deployed network function of vRANs, wherein the at least one network function initiates a Network Configuration Protocol (NETCONF) session with the configuration management device and the configuration management device pushes the day-one configuration to a network function controller when the NETCONF session successfully established;
send a request to the configuration management device to generate and push radio unit (RU) configuration to the at least one network function of the network function controller upon receiving the power-on notification message; and
send a notification response by sharing the parent network function connectivity information to the RU of the cell site, wherein the RU of the cell site initiates radiation upon receiving the radio configuration from the at least one network function of the network function controller.

17. A non-transitory computer-readable recording medium having recorded thereon instructions executable by at least one processor to perform a method for auto-commissioning of virtualized RANs, the method comprising:

receiving, by the auto-commissioning server, a plurality of parameters from a site controller of a cell site, an inventory, and a plurality of network entities;

automatically generating, by the auto-commissioning server, a day zero configuration based on the received plurality of parameters;

deploying, by the auto-commissioning server, at least one network function of the vRANs into a cloud server based on the automatically generated day zero configuration;

receiving, by the auto-commissioning server, a power-on notification message from a Radio Unit (RU) of the cell site, wherein the power-on notification message indicates that the RU of the cell site is ready for radio signal transmission; and activating, by the auto-commissioning server, the at least one deployed network function of the vRANs before transmitting a radio signal from the RU of the cell site.

* * * * *